US006502844B1

(12) United States Patent
Winland

(10) Patent No.: US 6,502,844 B1
(45) Date of Patent: Jan. 7, 2003

(54) MOTORCYCLE KICKSTAND AND DETENT MECHANISM

(76) Inventor: Stephen M. Winland, 1166 Portland Arch Rd., Covington, IN (US) 47932

( * ) Notice: Subject to any disclaimer, the term of this patent is extended or adjusted under 35 U.S.C. 154(b) by 0 days.

(21) Appl. No.: 09/644,772

(22) Filed: Aug. 23, 2000

(51) Int. Cl.[7] ................................................ B62H 9/00
(52) U.S. Cl. ...................................... 280/301; 280/293
(58) Field of Search ................................. 280/293, 301, 280/763.1; 248/188.8, 188.91, 351

(56) References Cited

U.S. PATENT DOCUMENTS

| 586,040 | A | | 7/1897 | Judge |
|---|---|---|---|---|
| 1,357,890 | A | | 11/1920 | Mohr |
| 1,435,625 | A | | 11/1922 | Schwinn |
| 1,984,299 | A | | 12/1934 | Cohen |
| 2,197,936 | A | | 4/1940 | Kraeft |
| 2,289,661 | A | | 7/1942 | Lewis |
| 2,395,148 | A | | 2/1946 | Schwinn |
| 2,434,423 | A | | 1/1948 | Maschin |
| 2,479,763 | A | | 8/1949 | Morris |
| 2,496,593 | A | | 2/1950 | Morgan |
| 2,553,466 | A | | 5/1951 | Morgan |
| 2,615,729 | A | * | 10/1952 | Atwood et al. ............. 280/301 |
| 3,188,041 | A | * | 6/1965 | Town .......................... 248/356 |
| 3,335,989 | A | * | 8/1967 | Bachmann .................. 248/158 |
| 3,622,180 | A | * | 11/1971 | Humlong ..................... 280/301 |
| 3,712,640 | A | | 1/1973 | Shipman et al. |
| 4,417,746 | A | | 11/1983 | Baron |
| 4,474,387 | A | | 10/1984 | Maranell et al. |
| 4,556,230 | A | | 12/1985 | Diekman |
| 4,875,794 | A | | 10/1989 | Kern, Jr. |
| 4,883,284 | A | | 11/1989 | Nakazawa et al. |
| 5,116,159 | A | | 5/1992 | Kern, Jr. et al. |
| 5,507,200 | A | | 4/1996 | Reed et al. |
| 5,553,471 | A | | 9/1996 | Hanners |
| 5,607,173 | A | | 3/1997 | Lai |
| 5,662,016 | A | * | 9/1997 | Fujita ........................... 83/137 |
| 5,671,988 | A | | 9/1997 | O'Neill |

FOREIGN PATENT DOCUMENTS

| FR | 1089233 | * | 3/1955 | ................. 280/301 |
|---|---|---|---|---|
| IT | 415461 | * | 10/1946 | ................. 280/301 |

* cited by examiner

*Primary Examiner*—Daniel G. DePumpo
(74) *Attorney, Agent, or Firm*—Woodard, Emhardt, Naughton Moriarty & McNett

(57) ABSTRACT

A vehicle stand, particularly a kickstand for motorcycles, includes a support arm and a angularly turned portion of the arm. The angularly turned portion is rotatably received in the bore of a carrier block, and the block is pivotally mounted in a bracket. The bracket is mounted to a vehicle and includes a locking slot at the top portion. A corresponding locking bar is provided at the top of the angularly turned portion of the support arm. When the kickstand is in the vehicle supporting position, this bar engages the slot when the weight of the vehicle is placed on the arm. The block includes a hole for receiving a compression spring to bias the block and consequently the angularly turned portion of the arm toward the unlocked position where the bar is removed from the slot. The carrier block also includes a ball detent mechanism including a threaded plug biasing a urethane plug against a hardened steel ball. The angularly turned portion includes two recesses corresponding to the detent ball to lock the kickstand in both a raised and lowered position.

35 Claims, 4 Drawing Sheets

MOTORCYCLE KICKSTAND AND DETENT MECHANISM

BACKGROUND OF THE INVENTION

The present invention relates to stands for vehicles. More particularly, but not exclusively, the present invention relates to stands carried on the vehicle body and moveable from a stowed position to a vehicle supporting position.

Vehicles, especially two wheeled vehicles such as motorcycles, often require supporting members to aid in parking and/or supporting the vehicle when the vehicle is not in use. Known generally as stands or kickstands, these supporting members usually include at least one vehicle supporting arm that is adapted to be articulated, such as by the operators foot, between a lowered position for supporting the vehicle and a raised position to be out of the way when the vehicle is in use. As it is important that the arm not inadvertently move toward the lowered position while the vehicle is in use, some prior art support members include an external tension spring connected between the vehicle body and a point on the vehicle supporting arm. Such a spring can yieldingly hold a kickstand in a raised position, and when the support arm is extended toward the lowered position, it can also yieldingly hold the stand in a lowered position. Examples of such prior art kickstands are shown in U.S. Pat. No. 5,507,200 to Reed et al. which is hereby incorporated by reference.

However, this external spring, along with undergoing the normal fatigue and stress of use, tends to accumulate road grime and is susceptible to impacts from flying debris, the road, and other obstacles. Accordingly, along with being unsightly and difficult to install and replace, the external tension spring is prone to failure which, if occurring while the vehicle is in use, can be extremely dangerous. In addition, proper functional operation of the spring also depends on proper connection and alignment of the kickstand supporting arm and the connecting brackets. These structures as well are prone to fatigue or damage during normal use.

To avoid the dangers associated with spring failure and/or other related kickstand damage, the spring can be periodically replaced. However, this is a time consuming and messy task that adds to the cost and complexity of general vehicle maintenance. Accordingly, there is a need for a stand configuration that eliminates the need for this external tension spring, or alternatively, provides a backup safety mechanism to use in combination with such a spring to reduce the risks associated with spring failure.

Moreover, stands are traditionally adapted to be locked in some manner into the lowered, vehicle-supporting position. In this way, minor jolts or the application of other forces to the vehicle do not cause the stand to retract to the raised position or otherwise fail to support the vehicle. Where the vehicle is expensive, top-heavy, or simply of substantial weight, the lowered position locking assembly must be configured to be particularly strong and reliable to avoid the vehicle falling and causing damage to itself or surrounding people or property. The problem of stand instability is particularly acute when attempting to park a vehicle on uneven or sloped surfaces.

One common method of locking the kickstand into a vehicle supporting position on heavier vehicles, for example those weighing more than approximately fifty pounds, is to provide a locking assembly that activates when the weight of the vehicle is placed onto the lowered kickstand. For example, a locking tab can be provided on a kickstand where the kickstand pivots under the weight of the vehicle to cause the tab to engage into a corresponding locking slot.

However, effective and smooth operation of some of these prior art locking assemblies depend upon the external spring. This spring generally serves both to facilitate proper alignment of the locking tab into the locking slot and to help disengage the locking assembly when the vehicle weight is lifted from the kickstand. Accordingly, there is a need for a stand that provides a weight activated locking mechanism that lessens or eliminates the dependence on an external tension spring. There is also a need for a kickstand design that provides improved safety and reliability for maintaining alignment and proper functioning of the locking assembly.

Moreover, there is a need for a novel stand structure having a simple and efficient design that reduces manufacturing and/or maintenance costs and is easy to assembly and install on a vehicle body. There is also a need for a stand design that is durable and can reliably withstand long periods of use without substantial maintenance. Finally, there is a need for a stand that is simple to disassemble for adjustments, maintenance, or customization.

In addition, plunger assemblies, including ball detent mechanisms, typically involve a spring biased plunger mounted on one body and adapted to engage a corresponding surface in a second body to control the relative motion therebetween. Typically the corresponding surface on the second body involves a surface detent into which the ball or plunger is received. However, traditional ball detent mechanisms are ineffective where a compact assembly with a high compression force is required. This is due in large part to the need for a metal spring to be large and heavy in order to be able to achieve a high compression force. Moreover, problems also arise from the inability to simply and efficiently pre-load other spring types when assembling a detent mechanism. In addition, typical prior art detent mechanisms are subject to wear and loss of resiliency upon repeated use, which makes them unsafe for use in many applications, such as where failure of a latch is dangerous. Accordingly, there is a need for an improved detent mechanism that is compact and durable yet able to achieve high compression forces. There is also a need for a detent mechanism that is easily assembled, disassembled, or adjusted.

These and other objects are achieved by various embodiments of the present invention.

SUMMARY OF THE INVENTION

In the first embodiment the invention provides a vehicle support apparatus including a housing mountable on a vehicle; a support mounted in the housing and translatable between a first position allowing operation of the vehicle and a second position for supporting the vehicle when the housing is on the vehicle; a locking member on the support that selectively engages a portion of the housing or the vehicle to prevent rotation of the support; and a plunger biased toward and cooperating with a non-smooth surface portion of the support member to yieldingly resist translation of the support member.

In a second embodiment a vehicle supporting apparatus includes a housing mountable on a vehicle; a support mounted in the housing and having at least two distinct pivot axes, whereby the support can rotate generally about one axis from a stowed to a vehicle supporting position and the support can rotate generally about a second axis from a locked to an unlocked position, the support having at least one non-smooth surface portion; and a plunger mounted on the housing and biased toward the support for engaging the non-smooth surface portion of the support to yieldingly resist movement of the support from the stowed position.

In a third embodiment a vehicle supporting apparatus includes a bracket; a carrier block received in the bracket and tiltable therein, the carrier block including a bore; and a support received in the bore for rotation therein; whereby the bracket may be placed on the vehicle and the support rotated to a vehicle supporting position, and wherein in further embodiments a stop assembly or a biasing spring can be provided on the block.

In a forth embodiment a low profile latch mechanism is provided including a plunger, a spring, and a threaded plug; wherein the threaded plug compress the spring to bias the plunger; wherein the spring comprises a solid compressible plastic; and whereby the amount of loading on the spring can be controlled by the number of turns of the threaded plug.

A fifth embodiment provides a support member for use in a vehicle stand mechanism including a supporting leg and an angularly turned portion on the supporting leg; the angularly turned portion being adapted to be received in the bore of a stand mechanism and having a connector near the top portion thereof for rigidly receiving a locking bar; the angularly turned portion having at least one surface recess therein; whereby the recess can receive a plunger to lock the supporting leg in a predetermined position.

DESCRIPTION OF THE PREFERRED EMBODIMENTS

Figure 1:
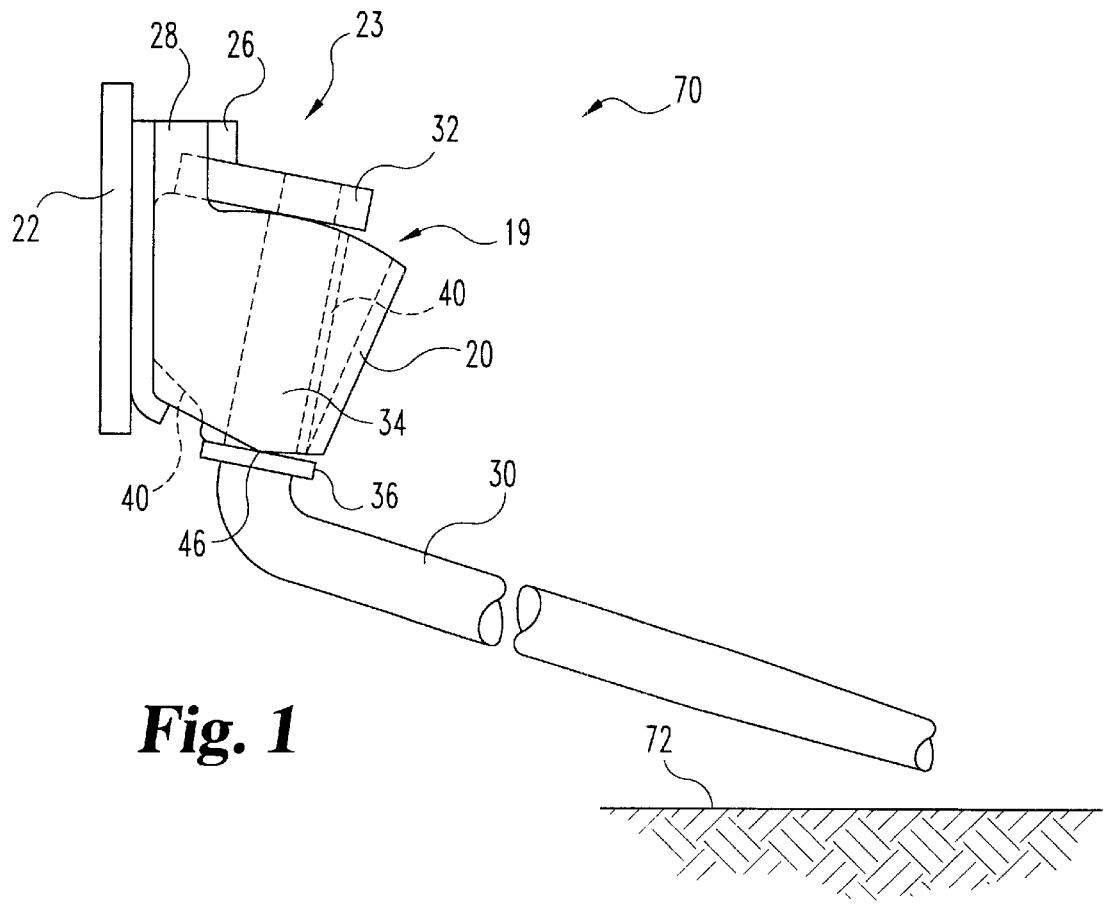
FIG. 1 is a side view of a kickstand device according to one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device and method, and further applications of the principles of the invention as illustrated therein are herein contemplated as would normally occur to one skilled in the art to which the invention relates.

In the description that follows, it should also be understood that like reference numeral are intended to identify the same or similar structural elements, portions, or surfaces consistently throughout the several drawing figures and the accompanying written description. Unless otherwise indicated, the drawings are intended to be read (e.g., cross-hatching, arrangement of parts, proportion, degree, etc.) together with the specification, and are to be considered as portion of the entire written description of this invention. Moreover, as used in the following description, the terms "horizontal", "vertical", "top", "bottom", "left", "right", "up", and "down", as well as adjectival and adverbial derivatives thereof, simply refer to the orientation of the illustrated structure as the particular drawing figure faces the reader.

Figure 2:
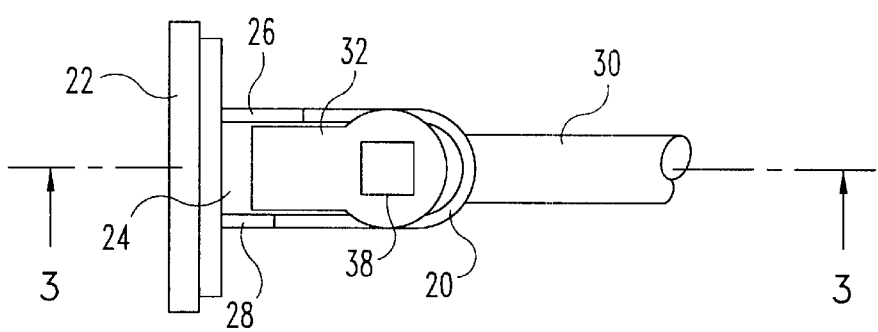
FIG. 2 is a top view of the device of FIG. 1.

Referring to the drawing figures, preferred embodiments of the claimed invention are illustrated. FIGS. 1 and 2 depict a kickstand assembly 70 according to one embodiment of the present invention. The assembly 70 includes a housing 19 including a bracket 20 mounted on, which includes being formed integrally with, a vehicle body portion 22. A support member is mounted in the bracket 20 and includes a supporting arm 30 adapted at one end to contact the ground 72. The support member, which is preferably a single formed piece of heat treated steel or other suitable strong metal or composite, also includes an angularly turned portion 34 received within the bracket 20 to both pivot and rotate therein. The supporting arm 30 is shown in FIGS. 1 and 2 in the lowered, vehicle-supporting position, but upon rotation of portion 34 within bracket 20, arm 30 pivots into a raised or stowed position for operation of the vehicle.

When in the lowered position, the weight of the vehicle 22 is rested on the arm 30. As a result, a force acts on the angularly turned portion 34 of the support member in a direction tending to push portion 34 toward the left side of bracket 20, and coincidentally, toward the vehicle body 22. Portion 34 is mounted in the housing 19 to allow a degree of tilting due to this force, and the kickstand assembly 70 includes a locking assembly 23 that utilizes this tilting motion to lock the arm 30 into the lowered, vehicle supporting position.

In the illustrated embodiment, the locking assembly 23 includes a locking bar 32 rigidly mounted at the top of the turned portion 34 and held thereon by a screw or bolt assembly (not shown). At a location on the housing 19 adjacent the locking bar 32, the bracket 20 includes rigid portions 26 and 28 that define channel 24. When portion 34 is pivoted toward the vehicle body 22 by application of the weight of the vehicle to arm 30, the tongue on bar 32 engages channel 24. Accordingly, in the configuration illustrated in FIG. 2, portions 26 and 28 constrain movement of locking bar 32 and consequently the rotation of portion 34 within bracket 20. In this way, support arm 30 is maintained in a vehicle supporting position when the weight of the vehicle is supported by arm 30.

As discussed above, angularly turned portion 34 both rotates and pivots inside bracket 20. Washer 36, which is preferably welded to the support member, and locking bar 32 which is preferably bolted, screwed, or clamped onto portion 34 are on either side of portion 34 within bracket 20. Both washer 36 and bar 32 are wider than the bracket 20 such that portion 34 is retained therein, with the upper portion of bracket 20 being rounded to facilitate travel of the bar 32 along bracket 20. The lower portion of bracket 20 includes two flat portions defining a point 46 contacting washer 36 about which the support member pivots when activating the locking assembly 23.

Figure 3:
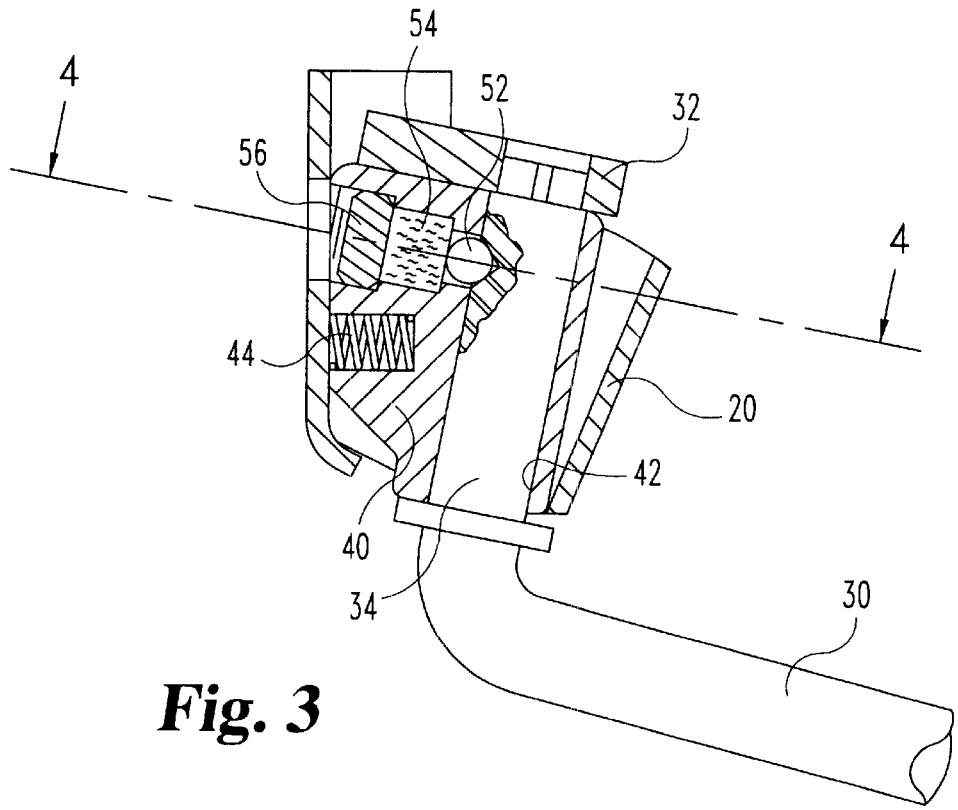
FIG. 3 is a side view in full section of the device of FIG. 1 viewed along line 3 of FIG. 2.
Figure 4:
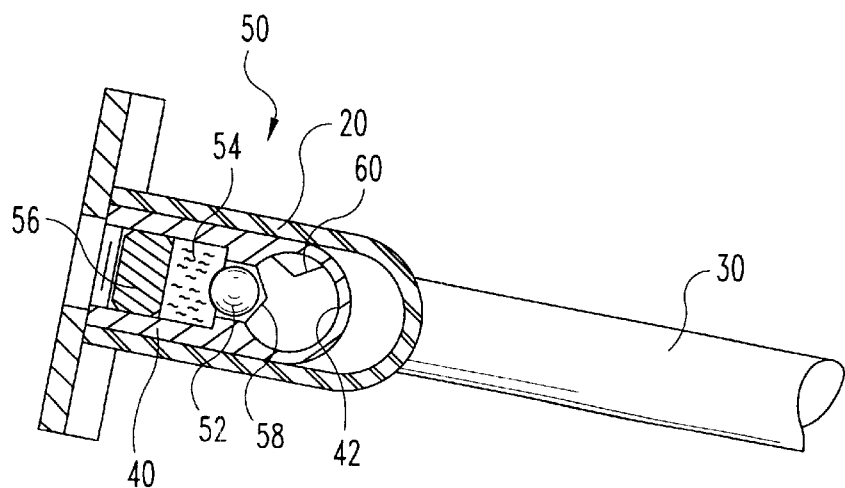
FIG. 4 is a top view in full section of the device of FIG. 1 viewed along line 4 of FIG. 3 showing features of the stop assembly.

As shown in FIGS. 3 and 4, housing 19 additionally includes carrier block 40 contained within bracket 20. Carrier block 40 includes bore 42 for rotatably receiving portion 34. Preferably bore 42 is a correspondingly smooth and cylindrical to provide continual surface interaction with and smooth rotation of portion 34. Block 40 pivots in conjunction with portion 34 and includes spring 44 for biasing block 40 to the right side of bracket 20. Spring 44 is compressed when the block 40 pivots toward the left side of bracket 20, and the left side of block 40 is configured to provide a relatively large area of contact with the left portion of bracket 20 when arm 30 is supporting the weight of vehicle. Particularly when heavier vehicles are being supported, the large contact area between bracket 20 and block 40, and between block 40 and portion 34, helps to reduce the stress on the assembly 70 to prolong its useful life.

Figure 5:
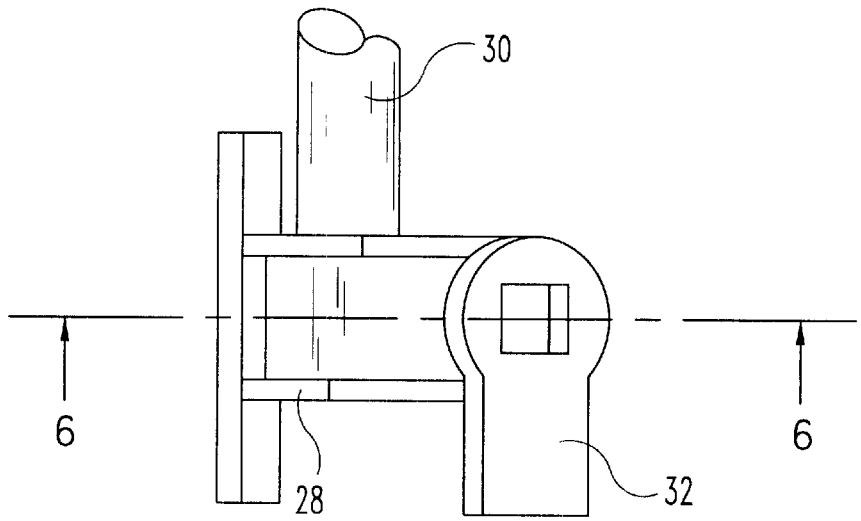
FIG. 5 is a top view of the device of FIG. 1 with the kickstand in a stowed position.
Figure 6:
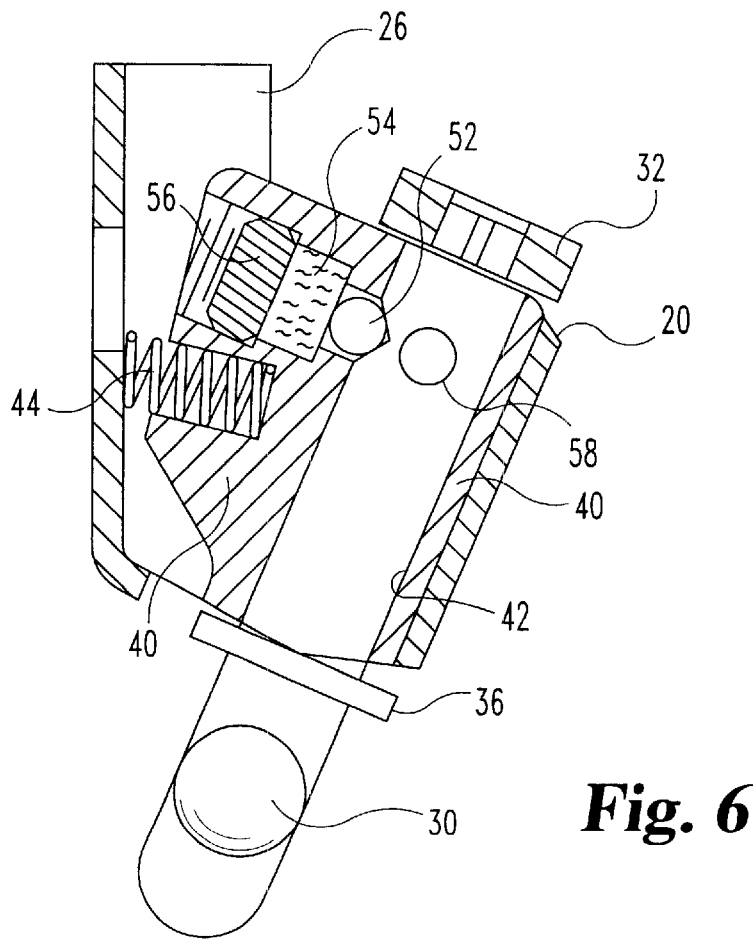
FIG. 6 is a side view in full section of the device of FIG. 5 viewed along line 6 of FIG. 5.
Figure 7:
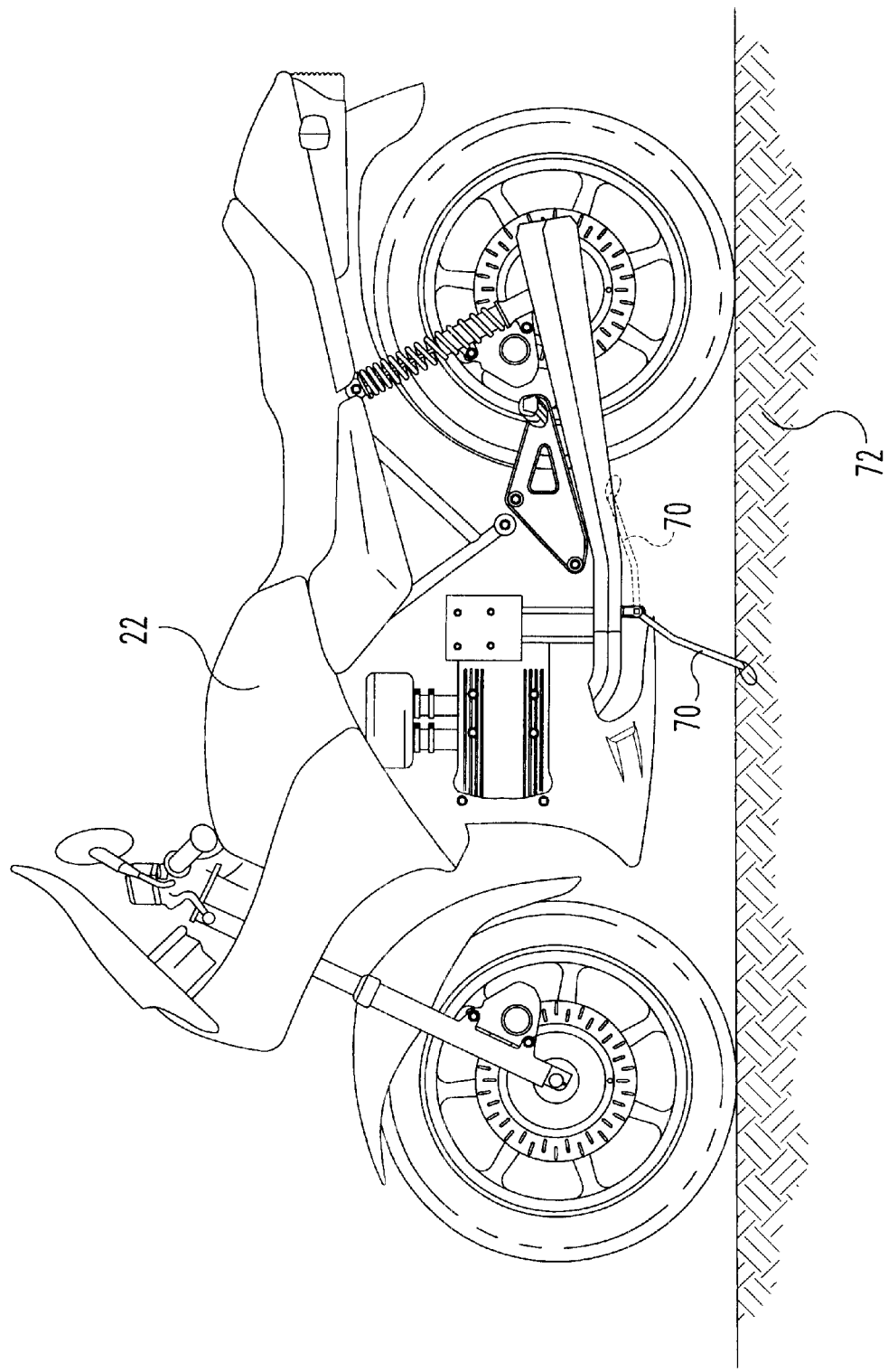
FIG. 7 is a side view of a motorcycle including a stand in both the raised and lowered positions according to one embodiment of the present invention.

Spring 44 also biases block 40 and portion 34 in a direction tending to remove locking bar 32 from slot 24. In the illustrated configuration, gravity also generally tends to bias block 40 in the same direction though such a configuration is not essential. Thus, when the weight of the vehicle is released from support arm 30, block 40, portion 34, and arm 30 are tilted and locking assembly 23 releases to allow movement of locking bar and rotation of support portion 34. With the weight of the vehicle released from the arm 30, arm 30 can pivot, and portion 34 can rotate, to place arm 30 into the raised or vehicle travel position depicted in FIGS. 5 and 6. In the illustrated embodiment, block 40 tilts in bracket 20 only far enough for bar 32 to clear housing portion 28 and not to clear housing portion 26. Rather, portion 26 extends farther from bracket 20 than does portion 28 such that rotation of portion 34 from the vehicle supporting orientation is only permitted in one direction when the weight of the vehicle is released.

When translating between the vehicle supporting and the raised or stowed positions, portion 34 rotates in block 40, and block 40 includes a stop assembly 50 for holding the support arm 30 in the raised position. Stop assembly 50 yieldingly resists rotation of portion 34 at selected positions, such as the raised and lowered positions, and includes a plunger mechanism mounted in the block 40 for selectively engaging surfaces of the support member.

The plunger mechanism includes ball 52 mounted in the housing 19 and biased by spring 54 towards the surface of portion 34 of supporting arm. Portion 34, which is otherwise smooth to facilitate rotation within block 40, has two surface disruptions, such as recesses 58 and 60, at approximately 90° relative position. These recesses cooperate with spring loaded ball 52 at both the raised and lowered positions of arm 30 to yieldingly resist rotation of support arm portion 34.

While stop assembly 50 can include only one or none of the recesses 58 and 60, advantages are provided by each recess. Recess 58, upon cooperation with the other parts of plunger assembly, serves to lock the position of portion 34 such that arm 30 is in a vehicle supporting position and tab 32 and slot 24 are aligned. While housing portion 28 serves as a positive stop to prevent over rotation of support arm 30, by constraining rotation of tab 32, the forces encountered during normal extension of the kickstand and contact between tab 32 and rigid housing portion 28 can weaken the connection between tab 32 and support arm portion 34. The provision of recess 58 serves to align tab 32 and slot 24 without requiring contact between tab 32 and housing portion 28, and can even be adapted to produce a sound indicating such alignment, such as a clicking sound when ball 52 engages recess 58. Moreover, even if support arm 30 were damaged by overzealous use, trauma, fatigue, or otherwise bent or placed slightly out of its desired position, tab 32 and slot 24, which are located on the other side of portion 34 relative to the location of arm 30, would likely still be undamaged and aligned. Therefore, the reliable operation of the locking assembly 23 is facilitated by providing recess 58.

In addition, recess 60 cooperates to lock the supporting arm into a raised position. Used in place of or in conjunction with another locking device, the recess 60 allows the kickstand to be securely stored when the vehicle is in use. Especially as oriented in the illustrated embodiment, with the rotational axis of portion 34 being at least 45° and more preferably approximately 25° from vertical, the component of the gravitational force tending to cause the arm 30 to pivot to a lowered position can be significantly reduced. Therefore, the requisite holding force needed by stop assembly 50 to reliably hold arm is a raised position can be easily, reliably, durably, and cost-effectively achieved by embodiments of the present invention.

Recesses 58 and 60, which can be spherical or conical or any other shape sufficient to effectively cooperate with plunger assembly, are preferably at least 0.025 inches, more preferably 0.05 inches, and most preferably 0.093 inches deep when the ball 52 is ⅜ in. in diameter. Alternatively, with appropriate modifications, surface portions identified as recesses 58 and 60 can actually be raised portions adapted to cooperate with a cavity in plunger assembly. In either case, because of the dangers associated with inadvertent movement of support arm 30, ball 52 is preferably highly loaded such that it is firmly biased toward and held in recesses 58 and 60.

Accordingly, the plunger mechanism is preferably though not essentially mounted on carrier block 40 and remains generally a fixed distance from the axial center of portion 34 as portion 34 rotates in block 40. While the plunger mounting can be by any means in the art, most preferably spring 54 is provided in a hole of carrier block 40 and compressed therein by plug 56. Plug 56, which can be a setscrew, clamp, or any other compression device, preferably is threaded and includes a screwdriver, alan wrench, or other suitable torque delivery device receiving portion. Most preferably plug 56 is screwed into an internally threaded hole in block 40 until it contacts spring 54. Additional torque is then applied to the plug 56 until a sufficiently high degree of preloading of spring 54 is achieved.

The hole in block 40 for receiving the plunger assembly is generally considered to have three portions. In the illustrated embodiment the plug 56 receiving portion, the spring 54 receiving portion, and ball 52 receiving portions are each of successively diminishing diameters. However, this is not required, and for convenience a single size hole can be used.

To allow adjustment, such as to the compression on spring 54, and to facilitate installation, bracket 20 includes hole 21 to allow access to the plug 56, spring 54, and ball 52 of plunger assembly while block 40 is confined within bracket 20. For example, block 40 can be pre-assembled with plunger assembly and spring 44 loosely installed in block 40. Block 40 is then placed into bracket 20 and into mating relationship with support arm portion 34, where portion 34 entered bracket 20 from below. With bar 32 and spring 44 properly installed, the assembly can be is completed by suitable tightening plug 56 for the desired operational characteristics of kickstand assembly 70.

In addition, it has been found that various spring types can generally be utilized in the present arrangement. Non-limiting examples include bellview springs (a series of successively concave and convex metallic washers), traditional metal coil springs, and compression die springs. However, superior results have been achieved by using a urethane or polyurethane plug which has been found to be resilient and reliable and able to advantageously achieve a high degree of pre-loading and biasing force with a relatively small amount of compression. By eliminating the need for a large degree of initial or operational compression, the relative dimension of the stop assembly 50, and consequently the amount of carrier block needed to house the plunger assembly is reduced. To further reduce the size of stop assembly 50, a low profile setscrew or plug 56 can be used.

In the preferred embodiment, the spring 54 is constructed of a solid compressible resilient material, such as plastic or rubber, and can including a urethane or polyurethane plug whose length is between 0.5 and 2 times, and preferably between 1 and 1.5 times, it's width. In the most preferred embodiment, the spring is a ⅜ in. diameter cylindrical hard plastic plug approximately ½ in. long with the compression axis being the length axis. In other embodiments, the assembly is configured for a maximum spring deflection of less than 50% and preferably only approximately 25% along the compression axis of the spring 54. In the most preferred embodiment the deflection is below 25% thereby reducing the need for a large corresponding recesses such as recesses 58 and 60.

In one embodiment, a Urethane (or Polyurethane) Die Spring, for example obtained from MSC Industrial Supply Co. of Chicago, Ill., or from Standard Die and Supply of Indianapolis, Ind. can be used. Most preferably a medium hardness polyurethane spring is utilized. Urethane obtained from Acrotech of Lack City, Minn. with a durometer rating of 95A is most preferably used.

It is also possible to preform the ball engaging side of the resilient material plug to conform to the profile of the plunger or ball 52. In still other embodiments, combinations of spring types can be used. In addition, other bodies, such as a lubricating washer, can be provided between the ball and spring 54.

While the plunger assembly is useful but not essential in a stand according to the present invention, it is also contemplated that the plunger assembly of the present invention can be used in other applications as well. For example, a threaded plug can be used to provide a compression force either directly or by mechanical coupling, onto a urethane plug whenever a high compression force is required with minimal deformation. Alternatively, a plug of other resilient material may be used as the spring member.

Moreover, to further lower the profile of the plunger assembly, the preloading and containing force can be applied by a threaded plug that has a low profile. For example, a plug with a low pitch where the thread only makes a few complete turns, such as between 3 and 7, most preferably approximately 5, may be used. This configuration is particularly useful, for example, to bias a plunger or ball in applications traditionally occupied by traditional ball detent mechanisms to provide stronger and more durable catches and latches in minimal space.

Furthermore, in the illustrated kickstand embodiment, the housing 19 is generally of uniform width along the direction of pivoting of block 40. In other words, as viewed in FIG. 2, the height of bracket 20 is generally constant as viewed from left to right. However, the housing need not be symmetrical and in one embodiment the housing has a wedge profile, or is angled such that, as block 40 is pivoted (either under the weight of the vehicle or by action of spring 44) a compression force is exerted on portion 34 to restrain rotation of portion 34. In these embodiments, bore 42 can include a vertical slot along or parallel to the axis of rotation of portion 34 to allow selective compression of portion 34. This selective compression can be used in addition to, or in place of, stop assembly 50, to lock the support arm 30 in either a raised or lowered position.

Furthermore, while locking assembly 23 includes bar 32 and slot 24 at the top portion of support arm portion 34, the assembly 23 can similarly be located anywhere along the stand assembly 70. In one embodiment assembly 23 is located below portion 34 and includes a tab and slot arrangement at the lower portion of housing 19. In still other embodiments assembly 23 can include electronics other signaling means to provide information about the relative orientation and status of assembly 70. For example, assembly 70 can be adapted to provide a warning or other signal to avoid or prevent operation of the vehicle while the arm 30 is in a lowered position, or assembly 70 can be modified to alert the operator when the assembly is locked into a vehicle supporting or a raised position.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A vehicle support apparatus comprising:

a housing mountable on a vehicle;

a support member mounted in said housing and translatable between a first position allowing operation of the vehicle and a second position for supporting the vehicle when said housing is on the vehicle;

a locking member on said support for engagement with a portion of said housing or the vehicle to prevent rotation of said support when a portion of the weight of the vehicle is supported by said support member; and a plunger biased toward and cooperating with a non-smooth surface portion of said support member to yieldingly resist translation of said support member when said support member is in said first position;

wherein said housing comprises a bracket mountable on said vehicle and a carrier block tiltable within said bracket and wherein said plunger is mounted on said carrier block.

2. The vehicle support apparatus of claim 1 wherein:

said non-smooth surface portion of said support member includes at least one surface indent to receive said plunger and cooperate therewith to resist translation of said support.

3. The vehicle support apparatus of claim 2 wherein:

said support member includes first and second surface indents to receive said plunger and cooperate therewith to resist translation of said support from said first and second positions respectively.

4. The vehicle support apparatus of claim 1 wherein:

said support member comprises a supporting leg and an angularly turned portion on said supporting leg; and wherein said angularly turned portion rotates in said housing when said supporting leg is moved to said first position.

5. The vehicle support apparatus of claim 4 wherein:

said non-smooth surface portion of said support member includes at least one surface indent to receive said plunger and cooperate therewith to resist translation of said support; and said at least one surface indent is on said angularly turned portion.

6. The vehicle support apparatus of claim 1 further comprising:

a spring biasing said plunger wherein said spring comprises urethane.

7. A vehicle supporting apparatus comprising:
a housing mountable on a vehicle;
a support mounted in said housing and having at least two distinct pivot axes, whereby said support can rotate generally about one axis from a stowed to a vehicle supporting position and said support can rotate generally about a second axis from a locked to an unlocked position, said support having at least one non-smooth surface portion; and
a plunger mounted on said housing and biased toward said support; and
wherein said plunger engages said non-smooth surface portion of said support when said support is in said stowed position to yieldingly resist movement of said support from said stowed position.

8. The vehicle supporting apparatus of claim 7 wherein:
said housing comprises a bracket mountable on said vehicle and a carrier block received in said bracket; and
wherein said carrier block includes a bore with said support rotatably received therein.

9. The vehicle supporting apparatus of claim 8 wherein:
said plunger is mounted on said carrier block.

10. The vehicle supporting apparatus of claim 9 wherein:
said carrier block is resiliently biased toward positioning said support in said unlocked position.

11. The vehicle supporting apparatus of claim 7 wherein:
said support includes a locking tab for engaging a member on said housing or said vehicle when said support is in said locked position.

12. The vehicle supporting apparatus of claim 11 wherein:
said housing comprises a bracket mountable on said vehicle and a carrier block received in said bracket; and
wherein a spring member is between said carrier block and said bracket biasing said tab to disengage with said member.

13. A vehicle supporting apparatus comprising:
a bracket;
a carrier block received in said bracket and tiltable therein, said carrier block including a bore;
a support received in said bore for rotation to a vehicle supporting position; and
a stop assembly comprising a stop member mounted on said carrier block and cooperating with a portion of said support to resist rotation of said support first position;
wherein said stop member comprises a plunger biased towards a surface of said support, and wherein said stop assembly further comprises at least one non-smooth portion on said support for receiving said plunger.

14. The vehicle supporting apparatus of claim 13 wherein:
said non-smooth portion comprises a recess on said support, and wherein said recess is at least about 0.05 inches deep.

15. The vehicle supporting apparatus of claim 14 further comprising:
a spring biasing said plunger wherein said spring comprises solid compressible plastic.

16. The vehicle supporting apparatus of claim 14 wherein:
there are two recesses on said support; and
wherein said bracket includes a hole for accessing said plunger while said block is in said bracket.

17. A kickstand comprising:
a bracket;
a carrier block received in said bracket and tiltable therein;
an angled support received in said carrier block and rotatable therein; and
a spring biased plunger mounted on said carrier block for engaging at least one recess in said angled support to hold said support in a selected position.

18. The kickstand of claim 17 further comprising:
a locking member in contact with said angled support operable to engage a locking slot when said bracket is in contact with a vehicle and the vehicle is supported by said angled support.

19. The kickstand of claim 18 further comprising:
a spring biasing said carrier block away from an inner surface of said housing.

20. The kickstand of claim 19 wherein said carrier block defines a cylindrical bore and said angled support is received in the cylindrical bore.

21. The kickstand of claim 18 wherein said bracket includes a locking slot for engagement with said locking member.

22. The kickstand of claim 21 further comprising a spring biasing the locking member out of engagement with the locking slot.

23. The kickstand of claim 22 wherein said spring biased plunger engages at least two recesses in said angled support.

24. The kickstand of claim 18 further comprising a spring contacting the carrier block and biasing said locking member out of engagement with the locking slot.

25. The kickstand of claim 18 further comprising a spring member between the carrier block and the bracket biasing said locking member out of engagement with the locking slot.

26. A kickstand comprising:
a bracket;
a carrier block received in said bracket and tiltable therein;
an support member received in said carrier block and rotatable therein; and
a spring biased plunger mounted on said carrier block for engaging at least one recess in said support member to hold said support member in a selected position.

27. The kickstand of claim 26 further comprising:
a locking member in contact with said support member operable to engage a locking slot when said bracket is in contact with a vehicle and the vehicle is supported by said support member.

28. The kickstand of claim 27 further comprising:
a spring biasing said carrier block away from an inner surface of said housing.

29. The kickstand of claim 26 wherein said carrier block defines a cylindrical bore and said support member is received in the cylindrical bore.

30. The kickstand of claim 27 wherein said bracket includes a locking slot for engagement with said locking member.

31. The kickstand of claim 30 further comprising a spring biasing the locking member out of engagement with the locking slot.

32. The kickstand of claim 31 wherein said spring biased plunger engages at least two recesses in an angularly turned portion of said support member. slot.

33. A kickstand comprising:
a support member including a supporting leg and an angularly turned portion on said supporting leg, said angularly turned portion being adapted to be received in the bore of a stand mechanism and having a connector near the top portion thereof rigidly receiving a locking bar, said locking bar adapted to cooperate with a locking tab on said vehicle to prevent rotation of said supporting leg when said supporting leg is in a vehicle supporting position and a portion of the weight of said vehicle is supported by said supporting leg, and said angularly turned portion having at least one surface recess therein whereby said recess can receive a plunger to lock said supporting leg in a predetermined position;

wherein the support member is rotatably received in a carrier block including a spring biased plunger for engagement with said surface recess;

wherein the carrier block is pivotally received in a bracket.

34. The kickstand of claim 33 wherein said bracket defines the locking tab for engagement with the locking bar when said bracket is mounted on a vehicle.

35. The kickstand of claim 34 wherein said carrier block is biased away from an inner surface of said bracket.

* * * * *